(12) United States Patent
Liu et al.

(10) Patent No.: US 10,956,369 B1
(45) Date of Patent: Mar. 23, 2021

(54) DATA AGGREGATIONS IN A DISTRIBUTED ENVIRONMENT

(71) Applicant: Amazon Technologies, Inc., Seattle, WA (US)

(72) Inventors: Yu Liu, Bellevue, WA (US); Robert McGregor Calhoun, Jr., Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 955 days.

(21) Appl. No.: 15/480,783

(22) Filed: Apr. 6, 2017

(51) Int. Cl.
*G06F 16/16* (2019.01)
*G06F 16/18* (2019.01)

(52) U.S. Cl.
CPC ........ G06F 16/164 (2019.01); G06F 16/1865 (2019.01)

(58) Field of Classification Search
CPC .............................. G06F 16/164; G06F 16/1865
See application file for complete search history.

(56) References Cited

U.S. PATENT DOCUMENTS

| | | | | |
|---|---|---|---|---|
| 7,933,962 B1 * | 4/2011 | Banerjee | ............. | G06F 16/2455 709/206 |
| 8,800,866 B1 * | 8/2014 | Gromley | ............... | G07F 19/209 235/375 |
| 8,868,514 B2 * | 10/2014 | Lomet | ..................... | G06F 16/27 707/682 |
| 8,924,346 B2 * | 12/2014 | Colrain | ................... | G06F 9/466 707/615 |
| 8,984,170 B2 * | 3/2015 | Colrain | ................. | H04L 67/146 709/248 |
| 9,122,729 B2 * | 9/2015 | Love | .................... | G06F 16/2477 |
| 9,195,939 B1 | 11/2015 | Goyal et al. | | |
| 9,934,233 B2 * | 4/2018 | Reid | ........................ | G06F 16/22 |
| 10,031,948 B1 * | 7/2018 | Kulshreshtha | .......... | G06F 9/466 |
| 10,379,958 B2 * | 8/2019 | Winokur | .............. | G06F 11/1471 |
| 2004/0148239 A1 * | 7/2004 | Albee | ..................... | G06Q 20/10 705/36 R |
| 2005/0193043 A1 * | 9/2005 | Hoover | .................. | G06F 19/328 |
| 2006/0080255 A1 * | 4/2006 | Riehl | ...................... | G06Q 20/10 705/45 |
| 2006/0271784 A1 * | 11/2006 | Bolosky | .................. | H04L 51/12 713/170 |
| 2008/0215465 A1 * | 9/2008 | Capadouca | .......... | G06Q 20/202 705/30 |
| 2009/0216901 A1 * | 8/2009 | Schloming | .............. | G06F 9/546 709/237 |
| 2009/0319532 A1 * | 12/2009 | Akelbein | .............. | G06F 16/185 |
| 2010/0030818 A1 * | 2/2010 | Cooper | .................. | G06F 16/273 707/703 |
| 2012/0166407 A1 * | 6/2012 | Lee | ...................... | G06F 16/2365 707/703 |

(Continued)

*Primary Examiner* — Robert W Beausoliel, Jr.
*Assistant Examiner* — Susan F Rayyan
(74) *Attorney, Agent, or Firm* — Thomas | Horstemeyer LLP

(57) ABSTRACT

The disclosure is related to a system that saves booking requests to a transaction data store and generates data aggregations from the booking requests. A two-phase booking process is employed that includes validating the local timestamp of a booking request. Asynchronous archiving of booking requests to an archive is also employed. Aggregations can be generated from the transaction archive.

20 Claims, 5 Drawing Sheets

(56) References Cited

U.S. PATENT DOCUMENTS

| | | | |
|---|---|---|---|
| 2012/0179645 A1* | 7/2012 | Lomet | G06F 16/27 |
| | | | 707/607 |
| 2013/0204697 A1* | 8/2013 | Boal | G06Q 30/0207 |
| | | | 705/14.51 |
| 2014/0109020 A1 | 4/2014 | Wielgosz | |
| 2015/0127431 A1 | 5/2015 | Thomas et al. | |
| 2015/0317349 A1* | 11/2015 | Chao | G06F 16/278 |
| | | | 707/615 |
| 2015/0347554 A1* | 12/2015 | Vasantham | G06F 16/2246 |
| | | | 707/622 |
| 2015/0363755 A1* | 12/2015 | Walden | G06Q 40/02 |
| | | | 705/43 |
| 2016/0019745 A1* | 1/2016 | Graham | G07F 17/3223 |
| | | | 463/31 |
| 2016/0098697 A1* | 4/2016 | Dunsmore | G06F 11/0748 |
| | | | 705/39 |
| 2016/0379013 A1* | 12/2016 | Ganesan | G06F 21/645 |
| | | | 713/176 |
| 2017/0063814 A1 | 3/2017 | Wachs et al. | |
| 2017/0103116 A1* | 4/2017 | Hu | G06F 16/2471 |
| 2017/0187686 A1 | 6/2017 | Shaikh et al. | |
| 2017/0364705 A1* | 12/2017 | Villars | G06F 21/6227 |
| 2018/0046239 A1 | 2/2018 | Schneider et al. | |
| 2018/0053086 A1 | 2/2018 | Liu et al. | |
| 2018/0062666 A1 | 3/2018 | Zhang et al. | |

\* cited by examiner

DATA AGGREGATIONS IN A DISTRIBUTED ENVIRONMENT

BACKGROUND

Creating data aggregations can be important for reporting and analysis purposes. For example, aggregations or collections of transactions that are grouped by time period can be useful to analyze performance or other characteristics over that time period. However, maintaining data aggregations over large datasets or for a large number of users can be a complex process. Complexity arises when idempotency of the transactions is desired. As one example, suppose transactions for a large number of users are housed in a data store. These users might request or desire the aggregate data for their transactions across various levels of granularity. A process or service can collect transactions from a transaction data store to calculate or compute aggregations. Accordingly, when an aggregation for a particular time interval is created, relative certainty can be desirable that a later-arriving transaction does not require inclusion into an already computed aggregation.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
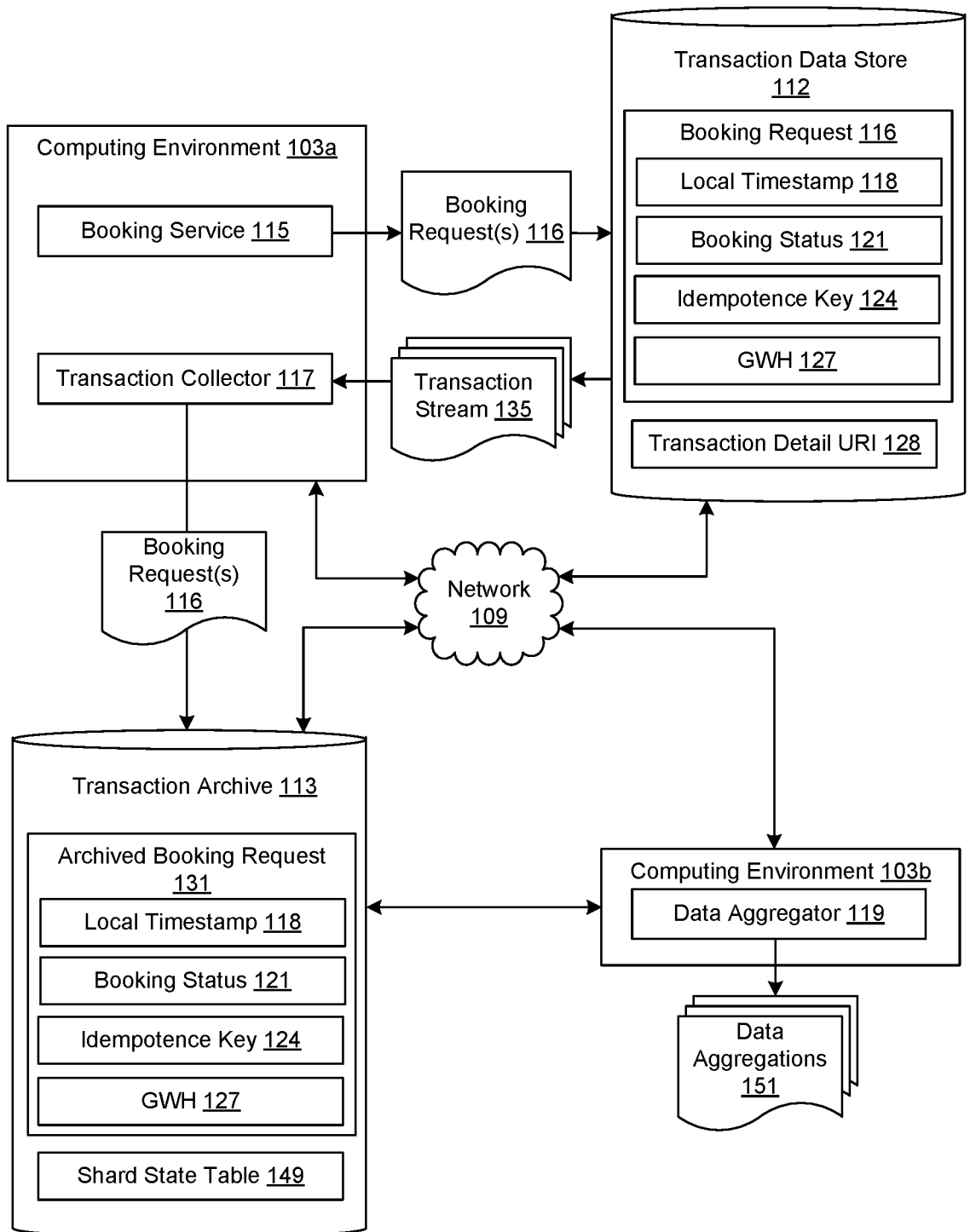
FIG. 1 is a block diagram of a networked environment according to various embodiments of the present disclosure.

The present application is directed to processing and storing transactions that are associated with data aggregations. A data aggregation represents a collection of data from transactions associated with a particular variable, such as a time period. Other examples of variables over which data can be aggregated include a transaction type, a tag applied to transactions, or any other categorization of data. For example, transactions associated with product sales might be associated with a timestamp corresponding to when the transaction occurred. Users may wish to view or otherwise group data into certain aggregations, such as transactions occurring within a particular hour, a particular day, week, year, etc.

Data aggregations can be desirable for reporting purposes, data visualization purposes, or generating periodic reports regarding transactions. For example, a user might wish to generate a report regarding sales volume for their account over a particular day, quarter, or year. As another example, a user might wish to generate a report regarding sales volume of a particular transaction type or transaction category over a particular hour within a day. In these scenarios, the user might wish to generate a report that includes a data aggregation, which can be based on a summation of particular data fields occurring within the desired time period. In other words, in one example, the user might want to view a report that is based on total sales in a particular hour or week. Data aggregations can be generated over any time period that a user or an administrator may require for analytics, reporting, or other purposes.

In other examples, aggregations can be created based upon a transaction count, a transaction rate, or minimum or maximum bounded values. For example, a transaction rate over a particular time period or categorized by a particular parameter can be generated. An aggregation can be defined by any calculation or assessment of how data should be aggregated, averaged, totaled or collected according to any other statistical measure.

In some systems, to generate such a report of transactions occurring in a particular time period, a process or service might have to query a transaction database or data store in which all transactions are stored. The query against the transaction database might be for transactions that occur in a particular hour of a particular day. The query run against the transaction database might require a query service to identify the data occurring within the hour from all of the transactions stored in the transaction database. This can be a costly operation in terms of computing or processing resources.

Additionally, in a distributed environment, transactions, or "booking requests," as referred to herein, might arrive from various hosts in a distributed fashion. The booking requests might be given a timestamp by the submitting host to a transaction data store that is based upon the clock of the host system. This clock might vary from the clock of another host system submitting booking requests or vary from a canonical or definitive network time that is being used by the transaction data store in which transactions or booking requests are housed. Accordingly, as booking requests arrive, it is not only a challenge to correctly place booking requests into the correct aggregations, but it is also important to ensure that later arriving booking requests do not require a particular aggregation to be updated or recalculated.

Accordingly, examples of the disclosure can persist booking requests within a transaction data store and also create data aggregations based upon the booking requests over various time intervals.

With reference to FIG. 1, shown is a networked environment 100 according to various embodiments. The networked environment 100 includes a computing environment 103a and 103b, a transaction data store 112, and a transaction archive 113 in communication via a network 109. The network 109 includes, for example, the Internet, intranets, extranets, wide area networks (WANs), local area networks (LANs), wired networks, wireless networks, or other suitable networks, etc., cable networks, satellite networks, or any combination of two or more such networks. In some examples, the computing environment 103a and 103b can be implemented in a single environment or fleet of machines or virtual machines. In other examples, the computing environment 103a and 103b can be implemented in separate fleets of machines or virtual machines.

A computing environment 103a, 103b can comprise, for example, a server computer or any other system providing computing capability. Alternatively, the computing environment 103a, 103b can employ a plurality of computing devices that can be arranged, for example, in one or more server banks, computer banks, or other arrangements. Such computing devices can be located in a single installation or may be distributed among many different geographical locations. For example, the computing environment 103a, 103b can include a plurality of computing devices that together can comprise a hosted computing resource, a grid computing resource, and/or any other distributed computing arrangement. In some cases, the computing environment 103a, 103b can correspond to an elastic computing resource where the allotted capacity of processing, network, storage, or other computing-related resources may vary over time.

Various applications and/or other functionality can be executed in the computing environment 103a. The components executed on the computing environment 103a, for example, include a booking service 115, a transaction collector 117, and other applications, services, processes, systems, engines, or functionality not discussed in detail herein. The booking service 115 is executed to serve requests from upstream systems to submit booking requests or transactions to a transaction data store 112. For example, the booking service 115 can interact with other systems in a larger distributed enterprise system that has upstream systems that submit transactions, such as entries in a general ledger system, to the booking service 115. For example, an upstream system can include an ordering system, a payments system, a digital goods system, an inventory system, or any other system that might process transactions that require archiving or booking within a transaction data store 112.

The transaction collector 117 can obtain a database stream or transaction stream 133 from the transaction data store 112, and archive booking requests 116 into a transaction archive 113. The transaction stream 135 can comprise a database stream produced by the transaction data store 112. The transaction stream 135 can include individual records that are streamed to the transaction collector 117 as and when they are updated by the booking service 115 within the transaction data store 112. The transaction stream 135 can be produced as a feature of the underlying database system that powers the transaction data store 112. For example, in a hosted or on-premises NoSQL database service, particular tables can be identified as ones for which a flow of information about changes are placed into the transaction stream 135 and sent to the transaction collector 117.

The transaction data store 112 represents a data store in which transactions or booking requests 116 are stored or housed. The transaction data store 112 can be implemented as a highly available and highly durable database system in which transactions can be stored. The transaction data store 112 can represent, in some examples, the authoritative storage area for transactions. In one scenario, the transaction data store 112 can represent a general ledger storage system for transactions for an enterprise are stored. The transaction data store 112 can also be geographically redundant or implemented on multiple devices or systems. In some examples, the transaction data store 112 can store data on various shards or tables. The transaction data store 112, depending upon the implementation, can represent a NoSQL or SQL database system. The transaction data store 112 can also be a multi-tenant environment in which other customers or other data is stored. The transaction data store 112 can also ensure transaction idempotence of booking requests 116 that are submitted to the transaction data store 112. Accordingly, the depicted representation of data organization within the transaction data store 112 is illustrative and meant to facilitate understanding of embodiments of this disclosure.

The data stored in the transaction data store 112 includes, for example, a table in which booking requests 116 are stored. As noted above, a booking request 116 can represent a transaction or a transaction request that an upstream system submits to the booking service 115 so that the transaction can be booked and stored within a general ledger system. The transaction data store 112 can be the transaction warehouse for the general ledger system in one embodiment. When housed within the transaction data store 112, a booking request 116 can be stored along with a local timestamp 118, a booking status 121, and an idempotence key 124. Some booking requests 116, depending upon whether the booking request 116 is in a committed or uncommitted status, can also be associated with a global write horizon 127, or GWH. The GWH 127 is a timestamp that is based upon an authoritative or definitive time that is used by the transaction data store 112. The GWH 127 can be generated from a network time source or other authoritative time source and indicates, for the purpose of generating data aggregations, a timestamp that indicates when data aggregations can be generated by downstream systems. Additional discussion of the GWH 127 is provided herein below.

The local timestamp 118 associated with a booking request 116 stored in the transaction data store 112 represents a timestamp generated by the booking service 115 and submitted along with a booking request 116 to the transaction data store 112 for storage. In a distributed system, there might be multiple host machines or threads associated with the booking service 115 that might generate slightly inconsistent timestamps. Accordingly, the local timestamp 118 is not based upon a definitive or authoritative time source, unlike the GWH 127.

The booking status 121 associated with a booking request 116 can have two possible values. The first value is a "tentative" or "uncommitted" status. An uncommitted booking status 121 is associated with a booking request 116 within the transaction data store 112 for a booking request 116 that has not yet been validated by the booking service 115. As will be described herein, a two-phase commit process is employed to store or archive booking requests 116 to the transaction data store 112.

The second possible value for the booking status 121 is a committed or a final status. As will be described below, a booking request 116 can be persisted or saved to the transaction data store 112 using a two-phase commit process. In the first phase, the booking request 116 is saved to the transaction data store 112 and given an uncommitted booking status 121. In the second phase, the local timestamp 118 is validated against a global write horizon. If the local timestamp 118 can be validated, the booking status 121 can be updated to a committed status and the global write horizon obtained by the booking service 115 can be saved with the booking request 116 in the transaction data store 112. In some examples, the booking service 115 can save a separate record to the transaction data store 112 for the first commit phase and the second commit phase. In this scenario, downstream systems, such as the transaction collector 117 and data aggregator 119, are instrumented to identify the different records associated with each commit phase. In some cases, downstream systems can also perform a cleanup process whereby uncommitted booking requests 116 are removed from the transaction data store 112 and ignored by a downstream process.

The idempotence key 124 represents a key that uniquely identifies the transaction within the transaction data store 112. The idempotence key 124 allows the booking service 115 to maintain transaction idempotence. The idempotence key 124 can be generated by or provided by the upstream system submitting the booking request 116 to the booking service. In some implementations, the booking request 116 can include a version so that a subsequent booking request can be submitted with the same idempotence key 124 in order to update transaction data associated with the key. For example, version 1 of a booking request 116 for a particular idempotence key 124 can provide a given set of transaction data. Version 2 of the booking request 116 for the particular idempotence key 124 can cause the booking service 115, upon determining that the request advances the version, to roll back or reverse any changes to a particular value caused by the previous version before storing the updated version of the booking request 116 in the transaction data store 112.

Booking requests 116, when saved or updated in the transaction data store 112 can be streamed by the transaction data store 112 via a transaction stream 135 to the transaction collector 117. The transaction stream 135 can include a booking request 116 or other form of record that is updated within the transaction data store 112 along with an indication of the shard or partition within the transaction data store 112 in which the record is stored. The transaction stream 135 can be provided to the transaction collector 117 or another service subscribed to the transaction stream 135 through an application programming interface (API) provided by the transaction data store 112. The transaction stream 135 can also be provided in the form of multiple or parallel shards to the transaction collector 117. The transaction stream 135 can also be provided with one or more guarantees for downstream consumers. These guarantees can include at least one delivery mechanism and a guarantee of the order of records in each shard, meaning that the records in the stream can be read in the same order as they were inserted into a shard within the transaction data store 112.

In some cases, the transaction data store 112 can store a transaction detail uniform resource identifier (URI) 128. In some implementations, the transaction detail data can be stored in a separate transaction detail archive within the transaction data store 112 or a data store external to the transaction data store 112.

The transaction archive 113 represents a data store in which transactions or booking requests 116 can be archived from the transaction data store 112. The transaction archive 113 can represent cold storage or backup storage for the transaction data store 112. The transaction archive 113 can also represent a system in which booking requests 116 are archived or mirrored by the transaction collector 117 as it extracts transactions from the transaction stream 135. The transaction data store 112 can represent, in some examples, a geographically redundant system or implemented on multiple devices or systems. In some examples, the transaction data store 112 can store data on various shards or tables. The transaction data store 112, depending upon the implementation, can represent a NoSQL or SQL database system. The transaction data store 112 can also be a multi-tenant environment in which other customers or other data is stored. Accordingly, the depicted representation of data organization within the transaction data store 112 is illustrative and meant to facilitate understanding of embodiments of this disclosure.

The data stored in the transaction archive 113 includes, for example, a table in which booking requests 116 are stored by the transaction collector 117. As noted above, a booking request 116 can represent a transaction or a transaction request that an upstream system submits to the booking service 115 so that the transaction can be booked and stored within a general ledger system. The transaction collector 117 can mirror the booking requests 116 into the transaction archive 113 as archived booking requests 131. In some cases, upon storing an archived booking request 116, the transaction collector 107 can also store an indication of which shard within the transaction data store 112 or from which shard of transaction stream 135 it was obtained.

In some examples, a shard state table 149 can be maintained by the transaction collector 117 within the transaction archive 113 or stored elsewhere by the transaction collector 117. The shard state table 149 can indicate a latest GWH obtained from the various shards within the transaction stream 135. The data aggregator 119, as will be discussed below, can consult the shard state table 149 to determine when it is appropriate to generate a data aggregation 151 for a particular interval.

The data aggregator 119 can generate data aggregations 151 from the archived booking requests 131 within the transaction archive 113. As noted above, a data aggregation 151 can represent a collection of data from booking requests 116 associated with a particular period of time. In one example, the period of time can be based upon the local timestamp 118 associated with a booking request and in turn an archived booking request 116.

Figure 2:
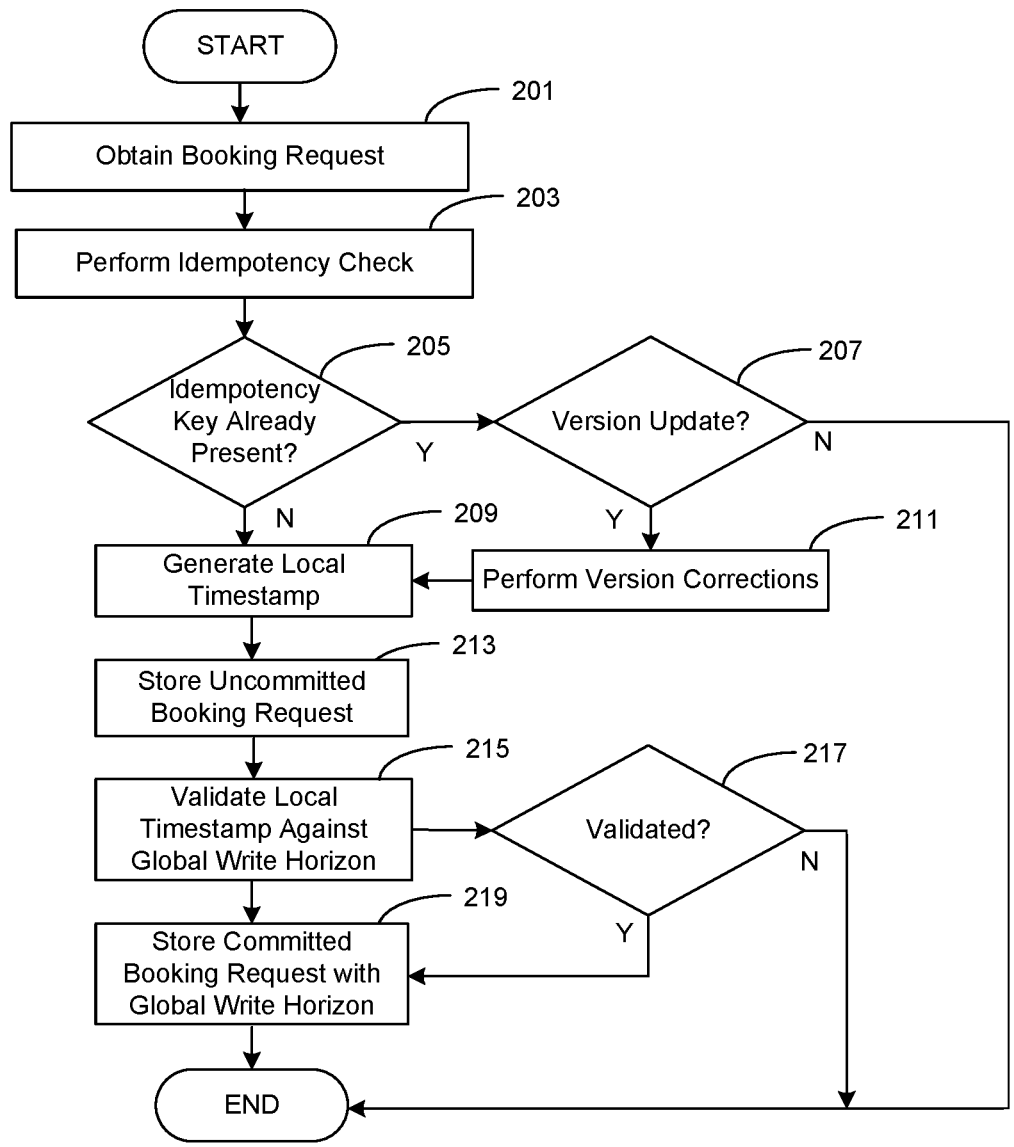
FIGS. 2-4 are flowcharts illustrating examples of functionality implemented as portions of a computing environment in the networked environment of FIG. 1 according to various embodiments of the present disclosure.

Referring next to FIG. 2, shown is a flowchart that provides one example of the operation of a portion of the booking service 115 according to various embodiments. It is understood that the flowchart of FIG. 2 provides merely an example of the many different types of functional arrangements that may be employed to implement the operation of the portion of the booking service 115 as described herein. As an alternative, the flowchart of FIG. 2 can be viewed as depicting an example of elements of a method implemented in the computing environment 103a, 103b according to one or more embodiments. FIG. 2 illustrates an example of how the booking service 115 can obtain a booking request 116 and follow a two-phase persist or storage protocol to store the booking request 116 within the transaction data store 112.

Beginning with box 201, the booking service 115 can obtain a booking request 116 from an upstream system. The booking request 116 can include an idempotence key 124 and transaction data associated with a transaction from the upstream system. The transaction data can include a financial transaction, an inventory transaction, or any other data for which transaction data is desired to be housed within the transaction data store 112. At box 203, the booking service 115 can perform an idempotency check by determining whether an entry corresponding to the idempotency key 124 is already present within the transaction data store 112. At box 205, the booking service 115 determines whether the idempotency key 124 is already present within the transaction data store 112. If the idempotency key 124 is already present within the transaction data store 112, meaning it corresponds to a previously submitted booking request 116, the process can proceed to box 207. Otherwise, the process proceeds to box 209. In some cases, if the idempotency key 124 within the booking request 116 corresponds to an uncommitted booking request 116 in the transaction data store 112, the booking service 115 can overwrite the record within the transaction data store 112.

At box 207, the booking service 115 determines whether the booking request 116 corresponds to a version update of a previous booking request 116 housed within the transaction data store 112. If not, the process can proceed to completion. In some cases, instead of proceeding to completion from box 207, the booking service 115 can return an error message to the upstream system submitting the booking request 116. For example, if the booking request 116 has the same or earlier version number than a version number of the booking request 116 housed within the transaction data store 112, the booking service 115 can safely assume that the booking request can be ignored.

However, if at box 207, the booking service 115 determines that the booking request has an advanced version number compared to a version number of the booking request 116 corresponding to the idempotence key 124 that is saved within the transaction data store 112, the process can proceed to box 211. At box 211, the booking service 115 can perform version correction of the transactions corresponding to the idempotence key 124 housed within the transaction data store 112. For example, if the transaction data for the received booking request 116 vary from the previous transaction data corresponding to the idempotence key 124, the booking service 115 can generate and save additional transactions that rollback or reverse the previous changes to one or more data values performed by the previous booking requests 115. In this way, downstream consumers of booking requests 116 saved within the transaction data store 112 receive the additional transactions that rollback or reverse the previous changes to the data values.

From box 211, the process can proceed to box 209, where the booking service 115 can continue the process of saving the booking request 116 to the transaction data store 112. At box 209, the booking service 115 can generate a local timestamp. In some examples, the local timestamp is received within the booking request 116 from the upstream system. In other examples, the local timestamp is created by the host system on which the booking service 115 is being executed, which can vary from machine to machine in a distributed system.

At box 213, the booking service 115 can store the booking request 116 along with an uncommitted booking status 121 and the local timestamp 118 in the transaction data store 112. The booking request 116 is also stored with the idempotence key 124 along with the transaction data associated with the booking request 116. Accordingly, storing the uncommitted booking request 116 to the transaction data store 112 represents phase one of the two phase persist or storage process employed by the booking service 115.

Next, the process can proceed to box 215, where the booking service 115 can validate the local timestamp 118 associated with the uncommitted booking request 116. The local timestamp 118 can be validated to ensure that it does not predate an authoritative time for the system or occurs too early. Accordingly, the booking service 115 can obtain or generate a global write horizon, which is based on an authoritative time source. The authoritative time source can be a network time service that returns an authoritative timestamp. Validation of the local timestamp 118 succeeds if the booking service 115 can validate that the local timestamp 118 does not predate the earliest allowed timestamp, which is also known as a GWH. The GWH is calculated by the booking service 115 from the authoritative time obtained from the authoritative clock less a buffer. The buffer can include a maximum allowed variance between the local clock of the system generating the local timestamp and the authoritative clock, or a maximum time error, and the latency (or a maximum allowed latency) between when the local timestamp 118 was generated and when the validation process commenced within the booking service 115.

Accordingly, if the local timestamp 118 is a timestamp that postdates the GWH, validation of the local timestamp 118 succeeds. At box 217, the booking service 115 can determine whether validation succeeds or fails. If validation fails, the process can proceed from box 217 to completion, and the booking request 116 is not saved with a committed status. If validation succeeds, the booking service 115 can proceed to box 219. At box 219, the booking service 115 can store the booking request 116 with a committed booking status 121 in the transaction data store 112. The booking request 116 can also be stored with the GWH that was retrieved or generated by the booking service 115 in the validation step of box 215. Thereafter, the process proceeds to completion.

With respect to the GWH, if a booking request 116 from any host executing the booking service 115 is associated with a GWH value and persisted as a committed record to the transaction data store at an authoritative time T, then after time T, any other hosts in a distributed environment will not be able to persist an uncommitted record which has local timestamp 118 that is earlier than this GWH and can still pass the time validation. This means if request A has been read from the transaction data stream 135 by transaction collector 117, then the system can guarantee that the transaction collector 117 has read all the uncommitted records that satisfy at least two properties. First, uncommitted booking requests 116 may potentially be committed eventually, and secondly, uncommitted booking requests 116 that have a booking date time earlier than GWH will remain uncommitted or be discarded by a cleanup process. In this way, embodiments of the disclosure can ensure the immutability and completeness of a data aggregation 151.

Figure 3:
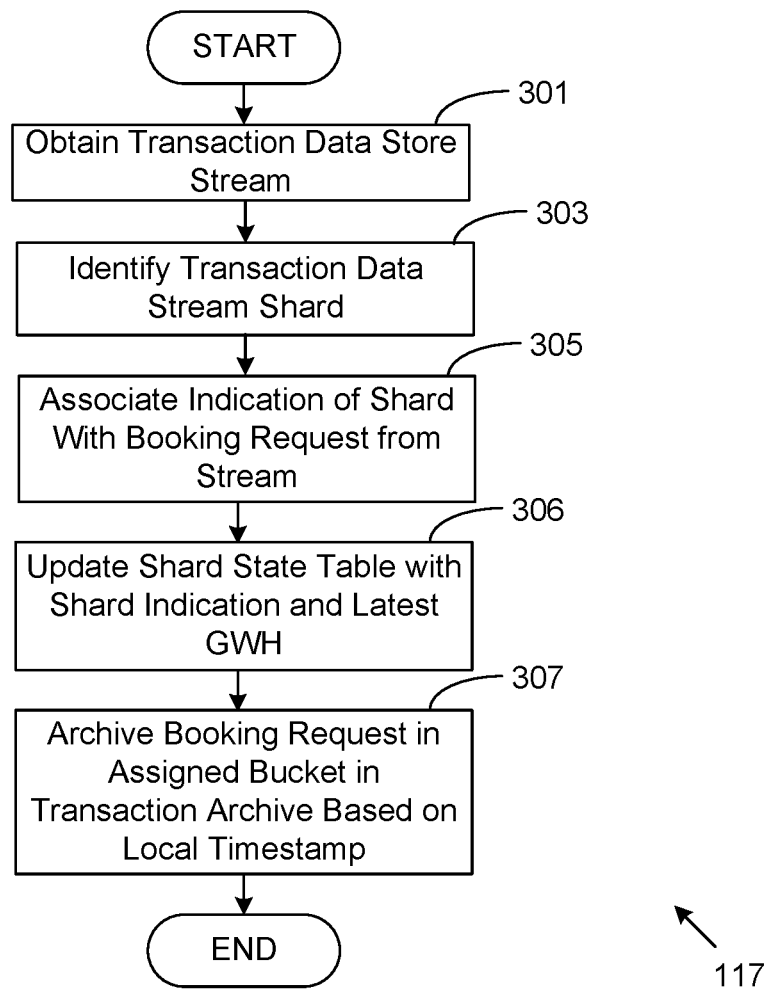

Referring next to FIG. 3, shown is a flowchart that provides one example of the operation of a portion of the transaction collector 117 according to various embodiments. It is understood that the flowchart of FIG. 3 provides merely an example of the many different types of functional arrangements that may be employed to implement the operation of the portion of transaction collector 117 as described herein. As an alternative, the flowchart of FIG. 3 can be viewed as depicting an example of elements of a method implemented in the computing environment 103*a*, 103*b* according to one or more embodiments. FIG. 3 illustrates an example of how the transaction collector 117 can obtain archive booking requests 116 into the transaction archive 113. The process shown in FIG. 3 can be executed asynchronously from the process shown in FIG. 2.

At box 301, the transaction collector 117 can obtain a transaction stream 133 corresponding to the shards within the transaction data store 112 that correspond to the booking requests 116 stored by the booking service 115. The booking requests 116 can be committed or uncommitted booking requests.

Upon encountering a record in the transaction data stream 133, the transaction collector 117 can identify the shard within the transaction data stream 133 at box 303. The shard indication can be later utilized by the data aggregator 119 to determine when a particular data aggregation for a particular interval can be initiated. In other words, the shard indication along with the GWH or local timestamp stored within committed booking requests 116 can facilitate a determination by the data aggregator 119 of when a particular shard or a set of booking requests 116 archived in the transaction archive 113 can be aggregated. The determination can be based upon the premise that additional booking requests 116 that are associated with a particular time interval will not be received.

At box 305, the transaction collector 117 can associate an indication of the shard from the transaction data stream 133 with the booking request 116. At box 306, the transaction collector 117 can update the shard state table 149 with the GWH of the booking request 116, which corresponds to the latest GWH obtained within the shard in which the booking request 116 was sent. The shard state table 149 indicates the latest GWH for booking requests 116 received from a particular shard of the transaction data stream 133.

At box 307, the transaction collector 117 can store the booking request 116 from the transaction data stream 133 into the transaction archive 113. The booking request 116 can be stored as an archived booking request 131 and in some cases be stored along with an indication of the shard in the transaction data store 112 in which the corresponding booking request 116 is stored or shard from the transaction data stream 133 from which the booking request 116 was obtained. In some cases, the booking request 116 can be stored in an assigned bucket within the transaction archive 113 based upon a local timestamp 118. For example, the transaction archive 113 can be organized into buckets based upon time intervals, and the booking request 116 can be assigned a bucket based upon its local timestamp 118. In this way, the data aggregator 119 can later generate data aggregations 155 by retrieving booking requests 116 from the appropriate buckets within the transaction archive 113. Thereafter, the process proceeds to completion.

Figure 4:
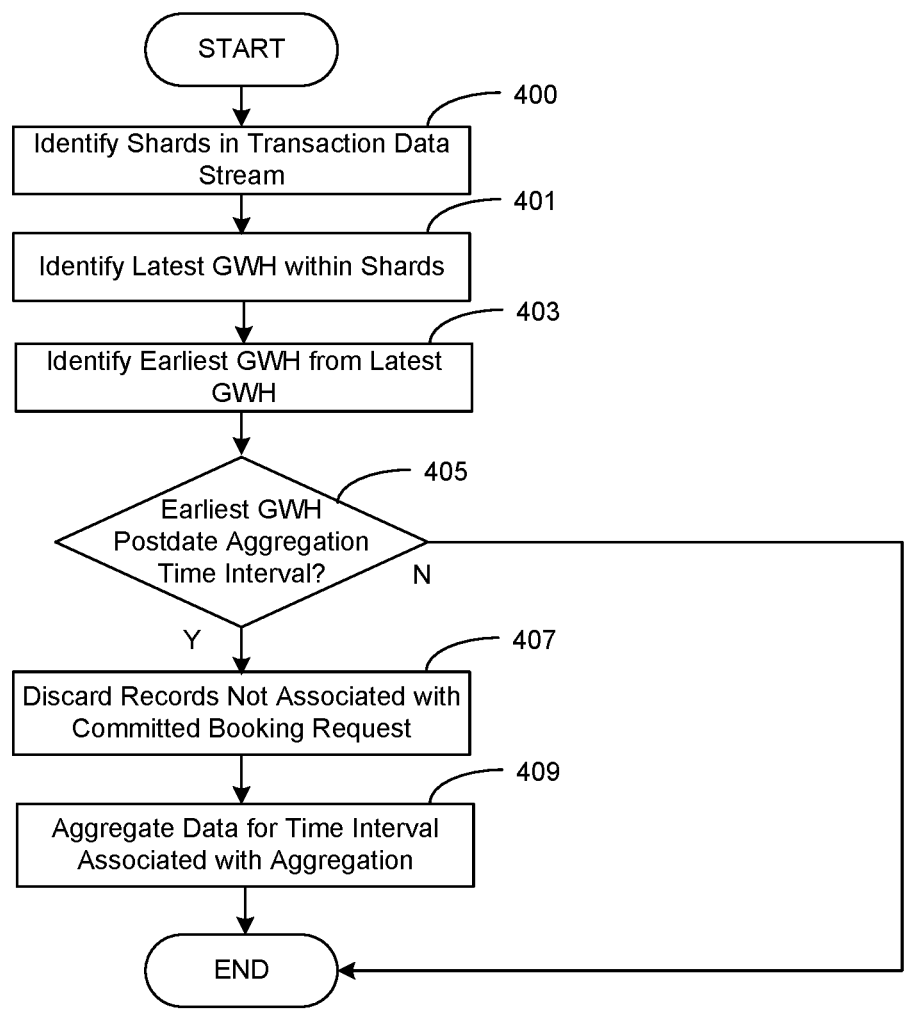

Referring next to FIG. 4, shown is a flowchart that provides one example of the operation of a portion of the data aggregator 119 according to various embodiments. It is understood that the flowchart of FIG. 4 provides merely an example of the many different types of functional arrangements that may be employed to implement the operation of the portion of the data aggregator 119 as described herein. As an alternative, the flowchart of FIG. 4 can be viewed as depicting an example of elements of a method implemented in the computing environment 103a, 103b according to one or more embodiments. FIG. 4 illustrates an example of how the data aggregator 119 can generate a data aggregation for a particular interval of time from archived booking requests 131 in the transaction archive 113. The process shown in FIG. 4 can be executed asynchronously from the process shown in FIG. 2 or FIG. 3.

The process shown in 401 can further exemplify a process in which the data aggregator 119 determines whether to generate a data aggregation 155 for one or more time intervals. At box 401, the data aggregator 119 can identify the shards within the transaction data stream 133. The shards can be identified from the shard state table 149. At box 401, the data aggregator 119 can identify the latest GWH from among the shards of the transaction data stream 133. In some cases, the latest GWH can be identified by consulting the shard state table 149. At box 403, once the latest GWH is identified, the data aggregator 119 can select the shard with the earliest from among the latest GWH. The data aggregator 119 can make this selection to identify a shard most likely to be ripe for aggregation over a particular interval of time. This earliest GWH from the shard state table 149, or from among the latest of the GWH from the shards can be known as the transaction stream state.

If, at box 405, the data aggregator 119 determines that the transaction stream state postdates the time interval for a particular data aggregation 155, the process can proceed to box 407, as the data aggregator 119 can determine that the interval is ripe for aggregation. Otherwise, the process can proceed to completion. At box 407, the data aggregator 119 can perform a cleanup process whereby uncommitted records are discarded from or ignored for the purpose of generating data aggregations 155. In some cases, uncommitted records can also be deleted from the transaction data store 112. The data aggregator 110 can also include an uncommitted record only if they are of 'Committed' status in the transaction data store—this can be caused by a delay of the committed operation thus a delay of appearance of committed records in the stream. At box 409, the data aggregator aggregate data from the archived booking requests 131 from the transaction archive 113 into a data aggregation 155. Thereafter, the process can proceed to completion.

Figure 5:
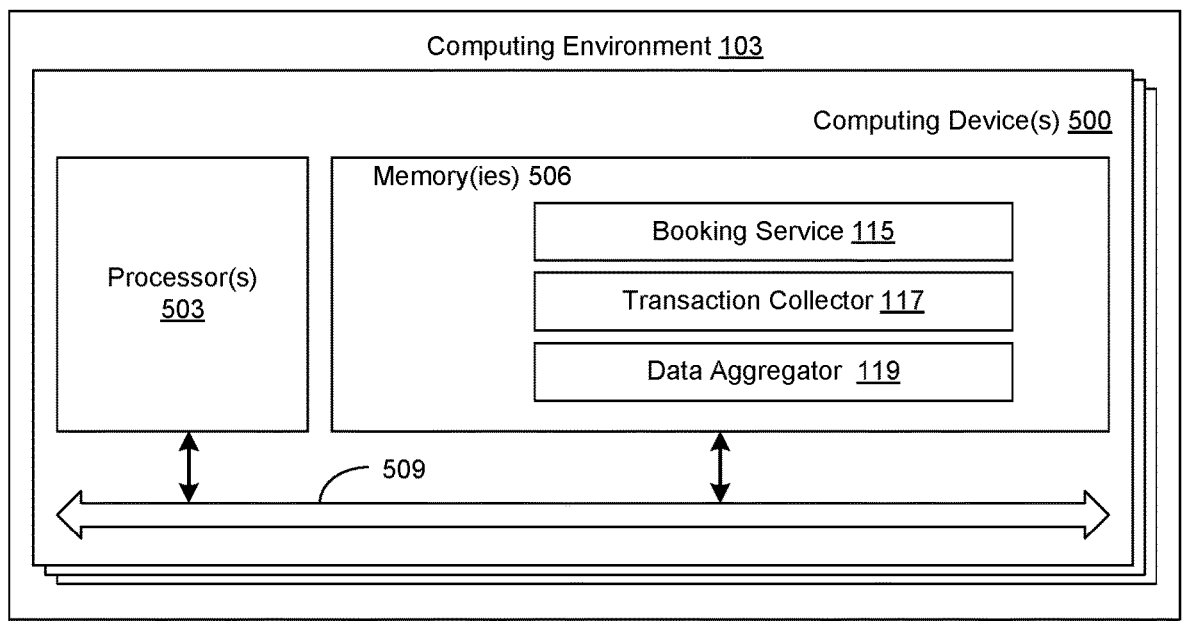
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the booking service 115, transaction collector 117, data aggregator 119, and potentially other applications. Also stored in the memory 506 may be a configuration data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the booking service 115, transaction collector 117, data aggregator 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-4 show the functionality and operation of an implementation of portions of the booking service 115, transaction collector 117, data aggregator 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the booking service 115, transaction collector 117, data aggregator 119, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the booking service 115, transaction collector 117, data aggregator 119, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:

obtaining, in at least one computing device, a booking request from an upstream system, the booking request corresponding to a request to store a transaction into a transaction data store, the booking request further comprising an idempotency key assigned to the request to store the transaction;

generating, by the at least one computing device, a local timestamp associated with the booking request, the local timestamp being based upon when the booking request is received by the one of the at least one computing device;

storing, by the at least one computing device, the booking request in the transaction data store, the booking request stored along with the idempotency key and the local timestamp in the transaction data store, the booking request further being stored with a designation that the booking request is uncommitted;

archiving, by the at least one computing device, the booking request in a transaction archive, the booking request being obtained from a transaction data stream from the transaction data store;

validating, by the at least one computing device, the local timestamp against a global write horizon, the global write horizon being based upon an authoritative time;

in response to validating, by the at least one computing device, the local timestamp against the global write horizon, storing a committed booking request in the transaction data store along with a designation that the committed booking request is committed, the committed booking request stored along with the global write horizon;

archiving, by the at least one computing device, the committed booking request in the transaction archive, the committed booking request being obtained from the transaction data stream from the transaction data store;

obtaining, by the at least one computing device, a table identifying a shard state of a plurality of shards within the transaction data stream;

identifying, by the at least one computing device, a stream state of the transaction data stream based upon the shard state of the plurality of shards, the stream state based upon an earliest global write horizon corresponding to the plurality of shards;

in response to determining that the stream state postdates a time interval, identifying a plurality of records within the transaction archive having a local timestamp that falls within the time interval; and generating a data aggregation based upon the plurality of records having the local timestamp that falls within the time interval.

2. The method of claim 1, wherein the authoritative time is obtained from a network time service accessible to the at least one computing device.

3. The method of claim 1, wherein validating the local timestamp based upon the global write horizon further comprises determining, by the at least one computing device, that the local timestamp postdates the global write horizon.

4. The method of claim 1, wherein the global write horizon further comprises the authoritative time adjusted by a maximum variance from the authoritative time.

5. The method of claim 1, wherein generating the data aggregation is performed asynchronously from obtaining the booking request.

6. A method, comprising:

obtaining, via at least one computing device, a booking request comprising an idempotency key and a local timestamp;

storing, via the at least one computing device, the booking request in a transaction data store along with an uncommitted designation;

validating, via the at least one computing device, the local timestamp against a global write horizon based upon an authoritative time;

archiving, via the at least one computing device, the booking request from a transaction data stream into a transaction archive;

in response to validating the local timestamp, storing, via the at least one computing device, a final booking request in the transaction data store along with a committed designation;

archiving, via the at least one computing device, the final booking request from the transaction data stream into the transaction archive; and generating, via the at least one computing device, a data aggregation based upon a particular time window from the transaction archive, wherein generating the data aggregation further comprises:

identifying a plurality of booking requests associated with an uncommitted designation from the transaction archive that are associated with a local timestamp corresponding to the particular time window;

determining whether each of the plurality of booking requests has a matching final booking request associated with a committed designation within the transaction archive;

discarding individual ones of the plurality of booking requests that fail to have the matching final booking request; and generating the data aggregation from the plurality of booking requests having the matching final booking request.

7. The method of claim 6, wherein generating the data aggregations is performed asynchronously from storing the booking request or storing the final booking request in the transaction data store.

8. The method of claim 6, further comprising determining when generating the data aggregation can begin based upon the global write horizon.

9. The method of claim 8, further comprising:

identifying a plurality of parallel shards comprising a plurality of final booking requests within the transaction data stream;

identifying a stream state from the plurality of shards, the stream state identified by identifying a plurality of latest final booking requests from the plurality of shards and identifying an earliest global write horizon from the latest final booking requests;

determining whether the stream state postdates the particular time window; and in response to determining that the latest final booking request horizon falls within the particular time window, generating the data aggregation from the transaction archive.

10. The method of claim 6, wherein archiving the final booking request from the transaction data stream into the transaction archive further comprises selecting a bucket within the transaction archive based upon the local timestamp of the booking request.

11. The method of claim 10, wherein generating the data aggregation further comprises identifying a plurality of booking requests stored in a particular bucket from the transaction archive that corresponds to a time interval that falls within the particular time window.

12. The method of claim 6, wherein the global write horizon further comprises the authoritative time adjusted by a maximum variance from the authoritative time.

13. The method of claim 6, wherein obtaining the booking request comprises obtaining the booking request from an upstream system.

14. The method of claim 6, wherein the local timestamp is generated by the at least one computing device.

15. A system, comprising:
   at least one computing device;
   a transaction data store in communication with the at least one computing device;
   a transaction collector executable by the at least one computing device;
   a transaction archive in communication with the at least one computing device;
   a booking service executable by the at least one computing device, wherein the booking service, when executed, causes the at least one computing device to at least:
      obtain a booking request comprising an idempotency key and a local timestamp;
      store the booking request in the transaction data store along with the local timestamp and an uncommitted designation;
      validate the local timestamp against a global write horizon based upon an authoritative time;
      in response to validating the local timestamp, store a final booking request in the transaction data store along with a committed designation;
      archive the booking request from the transaction data store in a transaction archive, the booking request obtained from a transaction data stream; and
      archive the final booking request from the transaction data store in a transaction archive if the local timestamp was validated, the booking request obtained from the transaction data stream; and
   a data aggregator executable by the at least one computing device, wherein the booking service, when executed, causes the at least one computing device to at least:
      generate a data aggregation based upon a particular time window from a plurality of booking requests and a plurality of final booking requests; and
   wherein the transaction collector archives the booking request and the final booking request along with an indication of a shard within the transaction data stream from which they are obtained.

16. The system of claim 15, wherein the booking service validates the local timestamp against the global write horizon by validating whether the local timestamp postdates the global write horizon.

17. The system of claim 15, wherein the data aggregator causes the at least one computing device to ignore booking requests that fail to correspond to a final booking request in the data aggregation.

18. The system of claim 15, wherein the data aggregator is executed asynchronously from the booking service.

19. The system of claim 15, wherein the data aggregator further causes the at least one computing device to at least:
   identify a plurality of booking requests associated with an uncommitted designation from the transaction archive that are associated with a local timestamp corresponding to the particular time window;
   determine whether each of the plurality of booking requests has a matching final booking request associated with a committed designation;
   delete individual ones of the plurality of booking requests from the transaction data store that fail to have the matching final booking request; and
   generate the data aggregation from the plurality of booking requests having the matching final booking request.

20. The system of claim 15, wherein the booking service obtains the booking request from an upstream system.

* * * * *